(12) United States Patent
Friend

(10) Patent No.: US 6,626,437 B2
(45) Date of Patent: Sep. 30, 2003

(54) WIPER SEAL

(75) Inventor: Anthony David Friend, Darien, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/025,486

(22) Filed: Dec. 26, 2001

(65) Prior Publication Data

US 2003/0164592 A1 Sep. 4, 2003

(51) Int. Cl.$^7$ ................................................ F16J 15/16
(52) U.S. Cl. ........................................ 277/500; 277/550
(58) Field of Search ............................... 277/500, 549, 277/550, 560, 459, 460

(56) References Cited

U.S. PATENT DOCUMENTS

| | | | |
|---|---|---|---|
| 2,868,566 A | * | 1/1959 | Kosatka ...................... 277/575 |
| 3,720,418 A | | 3/1973 | Berg |
| 3,830,508 A | | 8/1974 | Endicott |
| 4,258,927 A | | 3/1981 | Cather, Jr. |
| 4,359,228 A | | 11/1982 | Cather |
| 4,618,153 A | | 10/1986 | Nilsson |
| 4,709,932 A | | 12/1987 | Edlund et al. |
| 4,984,812 A | | 1/1991 | Wada et al. |
| 5,137,285 A | | 8/1992 | Pick |
| 5,213,343 A | | 5/1993 | White, Jr. |
| 5,263,404 A | | 11/1993 | Gaucher et al. |
| 5,288,086 A | | 2/1994 | Kiesel |
| 5,503,408 A | | 4/1996 | Hemann et al. |
| 5,947,080 A | | 9/1999 | Weissman et al. |
| 5,957,461 A | | 9/1999 | Ulrich |
| 6,045,137 A | * | 4/2000 | Friend et al. ................ 277/560 |
| 6,047,970 A | * | 4/2000 | Friend et al. ................ 277/550 |
| 6,116,613 A | | 9/2000 | Friend et al. |

* cited by examiner

*Primary Examiner*—William L Miller

(57) ABSTRACT

A wiper seal for a hydraulic component is provided. The wiper seal includes a support member and a body portion. The support member includes a first leg having an inner surface, a first end, and a second end. The first leg extends substantially parallel to a reference axis. A second leg having an outer surface extends substantially perpendicular to the reference axis from the first end of the first leg. The body portion defines an opening therethrough and includes an outer peripheral surface configured to receive the inner surface of the first leg of the support member, a first radial face extending substantially coplanar to the outer surface of the second leg, an inner surface disposed at an angle relative to the reference axis and extending to a lip adjacent the first radial face, and a second radial face extending generally perpendicular to the reference axis from the second end of the first leg of the support member. The first radial face includes a first cutout and the second radial face includes a second cutout.

13 Claims, 2 Drawing Sheets

US 6,626,437 B2

WIPER SEAL

TECHNICAL FIELD

The present invention is directed to a seal for a hydraulic component. More particularly, the present invention is directed to a wiper seal for a rod in a hydraulic component.

BACKGROUND

Many work machines, such as tractors, excavators, loaders, and other earth moving equipment, utilize hydraulic components to generate the force required to accomplish their tasks. These hydraulic components, which include, for example, hydraulic actuators, hydraulic cylinders, and fluid motors, typically include two fluid chambers disposed on opposite sides of a moveable element. Pressurized fluid is introduced into one of the fluid chambers, which causes the moveable element to move relative to the hydraulic component housing.

The moveable element is usually connected to a work implement on the work machine through a rod or shaft. Typically, each hydraulic component includes a sealing arrangement that prevents pressurized fluid from leaking from the fluid chambers of the hydraulic component during use. One such sealing arrangement for a hydraulic cylinder is described in U.S. Pat. No. 6,116,613.

A sealing arrangement for a hydraulic component may include a series of seals. In one such sealing arrangement for a hydraulic cylinder, three seals are disposed in the cylinder head to engage the shaft proximate the exit point of the shaft. The cylinder head typically includes a series of annular grooves, or counter bores, that are configured to receive each of the three seals. The first seal, which is placed closest to the pressurized fluid, is known as a buffer seal. The buffer seal forms a high pressure seal with the shaft to prevent the pressurized fluid from escaping the hydraulic cylinder. Due to the high operating pressures of the hydraulic cylinders, however, some of the pressurized fluid will leak through the buffer seal.

The second seal, which is placed on the opposite side of the buffer seal from the fluid chamber is known as a "U-cup" seal. This seal typically has a notch or groove that forms a "U" shape. This seal provides a second seal to prevent the fluid that has leaked through the buffer seal from escaping the hydraulic cylinder. This fluid is captured in a gap between the buffer seal and the "U-cup" seal and in the notch or groove in the seal. When operating conditions permit, the buffer seal allows the captured fluid to bypass the buffer seal and return to the system.

The third seal, or the outermost seal, is known as a wiper seal or, alternatively, as a rod seal or a rod scraper seal. This seal prevents dirt or debris from entering the system and contaminating the fluid. Some wiper seals may also wipe any remaining fluid from the surface of the shaft. The fluid removed from the surface of the shaft is collected in a gap between the "U-cup" seal and the wiper seal. Other wiper seals may leave a thin film of fluid on the surface of the shaft as the shaft is extended.

To prevent dirt or debris from entering the system, a lip of the wiper seal must remain in contact with the surface of the shaft. Accordingly, the wiper is configured to have a close fit with the surface of the shaft so that the lip exerts a relatively high pressure on the surface of the shaft. After extended use, the pressure of the lip on the surface of the shaft may create wear marks, such as grooves, in the surface of shaft. Excessive wear marks on the shaft may reduce the effectiveness of the sealing arrangement and allow fluid to leak from the housing.

In addition, the lip of the wiper seal may not create a uniform seal around the surface of the shaft. In some cases, this may result in an uneven layer of fluid remaining on the surface of the shaft as the shaft extends from the cylinder head. This uneven distribution of fluid on the shaft may give the false impression that the sealing assembly is leaking and is need of repair.

The wiper seal of the present invention is directed to solving all or some of the problems set forth above.

SUMMARY OF THE INVENTION

One aspect of the invention is directed to a wiper seal for a hydraulic component. The wiper seal includes a support member and a body portion. The support member includes a first leg having an inner surface, a first end, and a second end. The first leg extends substantially parallel to a reference axis. A second leg having an outer surface extends substantially perpendicular to the reference axis from the first end of the first leg. The body portion defines an opening therethrough and includes an outer peripheral surface configured to receive the inner surface of the first leg of the support member, a first radial face extending substantially coplanar to the outer surface of the second leg, an inner surface disposed at an angle relative to the reference axis and extending to a lip adjacent the first radial face, and a second radial face extending generally perpendicular to the reference axis from the second end of the first leg of the support member. The first radial face includes a first cutout and the second radial includes a second cutout.

According to another aspect, the present invention is directed to a hydraulic component that includes a housing that defines at least one chamber configured to hold a pressurized fluid and has a head that defines an opening. A rod having a surface is disposed for sliding movement in the opening of the housing. A wiper seal is disposed in the housing and includes a support member and a body portion. The support member includes a first leg having an inner surface, a first end, and a second end. The first leg extends substantially parallel to a reference axis. A second leg having an outer surface extends substantially perpendicular to the reference axis from the first end of the first leg. The body portion defines an opening configured to receive the rod and includes an outer peripheral surface configured to receive the inner surface of the first leg of the support member, a first radial face extending substantially coplanar to the outer surface of the second leg, an inner surface disposed at an angle relative to the reference axis and extending to a lip adjacent the first radial face and configured to engage the surface of the rod, and a second radial face extending generally perpendicularly to the reference axis from the second end of the first leg of the support member. The first radial face includes a first cutout and the second radial includes a second cutout.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Reference will now be made in detail to an embodiment of the present invention, an example of which is illustrated in the accompanying drawings. Wherever possible, the same reference numbers will be used throughout the drawings to refer to the same or like parts.

Figure 1:
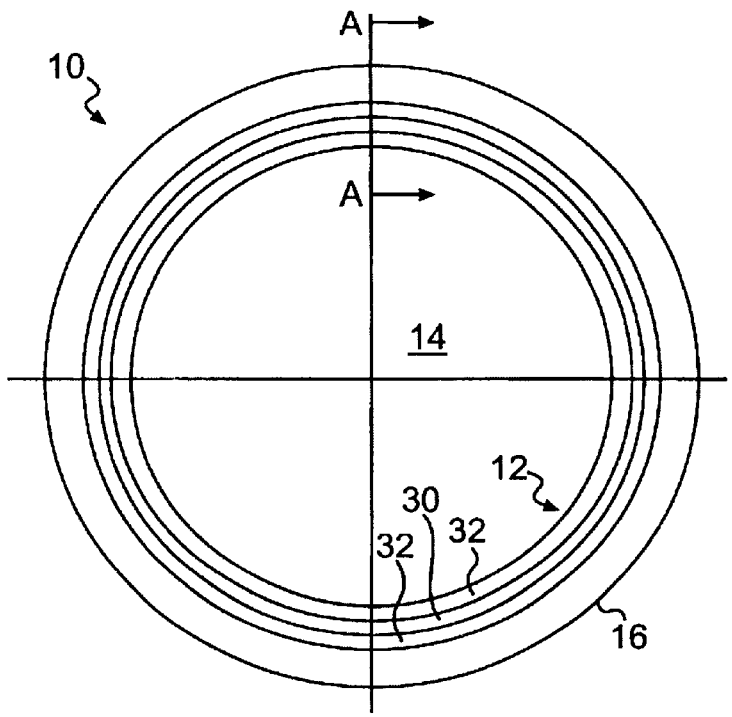
FIG. 1 is a side view of a wiper seal in accordance with an exemplary embodiment of the present invention.

As illustrated in the accompanying drawings, a wiper seal 10, which may also be referred to as a rod seal or a rod scraper seal, for a hydraulic component 50 is provided. As illustrated in FIG. 1, wiper seal 10 includes a body portion 12 and a support member 16. Both body portion 12 and support member 16 may have a substantially circular shape and define a substantially circular opening 14. In an exemplary embodiment, body portion 12 may be constructed of an elastomeric material, whereas support member 16 may be constructed of a metallic material.

Figure 2:
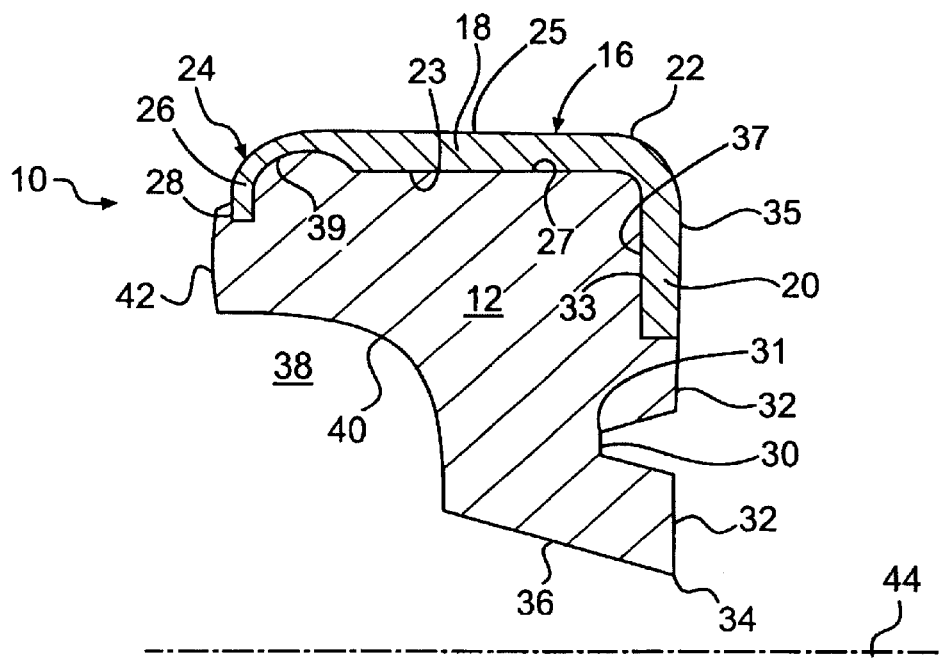
FIG. 2 is a cross-sectional view of the wiper seal of FIG. 1, taken along line A—A.

As illustrated in FIG. 2, support member 16 includes a first leg 18 that extends substantially parallel to a reference axis 44. First leg 18 includes an inner surface 23 and an outer surface 25. First leg 18 also includes a first end 22 and a second end 24. Second end 24 of first leg 18 may include a curved portion 26.

Support member 16 also includes a second leg 20. Second leg 20 extends substantially perpendicularly to reference axis 44 from first end 22 of first leg 18. Second leg 20 includes an outer surface 35 and an inner surface 37.

As also shown in FIG. 2, body portion 12 includes an outer peripheral surface 27. Outer peripheral surface 27 is configured to receive inner surface 23 of support member first leg 18. Outer peripheral surface 27 may include a curved portion 39 corresponding to curved portion 26 of first leg 18. In addition, outer peripheral surface 27 may include a notch 28 configured to receive second end 24 of first leg 18.

Body portion 12 also includes a first radial face 32 that extends substantially perpendicular to reference axis 44. First radial face 32 is substantially co-planar with outer surface 35 of second leg 20. First radial face 32 includes a first cutout 30. Referring to FIG. 1, first cutout 30 may extend along the entire surface of first radial face 32 and form a circle around opening 14.

First cutout 30 may be, for example, a notch, channel, or groove in first radial face 32. The inner surface 31 of first cutout 30 may be curved. Alternatively, the inner surface 31 of first cutout 30 may be squared or angled. First cutout 30 may be substantially centered within first radial face 32. Alternatively, first cutout 30 may be disposed at a location that is off-center with respect to first radial face 32.

First radial face 32 may also include a notch 33. Notch 33 is configured to receive second leg 20 of support member 16. When second leg 20 is engaged with notch 33, outer surface 35 of second leg 20 substantially aligns with first radial face 32.

As further shown in FIG. 2, body portion 12 includes an inner surface 36. Inner surface 36 may extend at an angle relative to reference axis 44. Inner surface 36 extends to a lip 34 that is adjacent to first radial face 32.

Body portion 12 also includes a second radial face 42. Second radial face 42 may extend substantially perpendicularly to reference axis 44. Second radial face 42 may be disposed at a location that is past second end 24 of support member first leg 18. In other words, a section of body portion 12 extends past the second end 24 of support member first leg 18.

Body portion 12 may also include a second cutout 38. Second cutout 38 may be disposed on the opposite side of body portion 12 from first cutout 30. A second cutout surface 40 connects second radial face 42 with inner surface 36.

Figure 3:
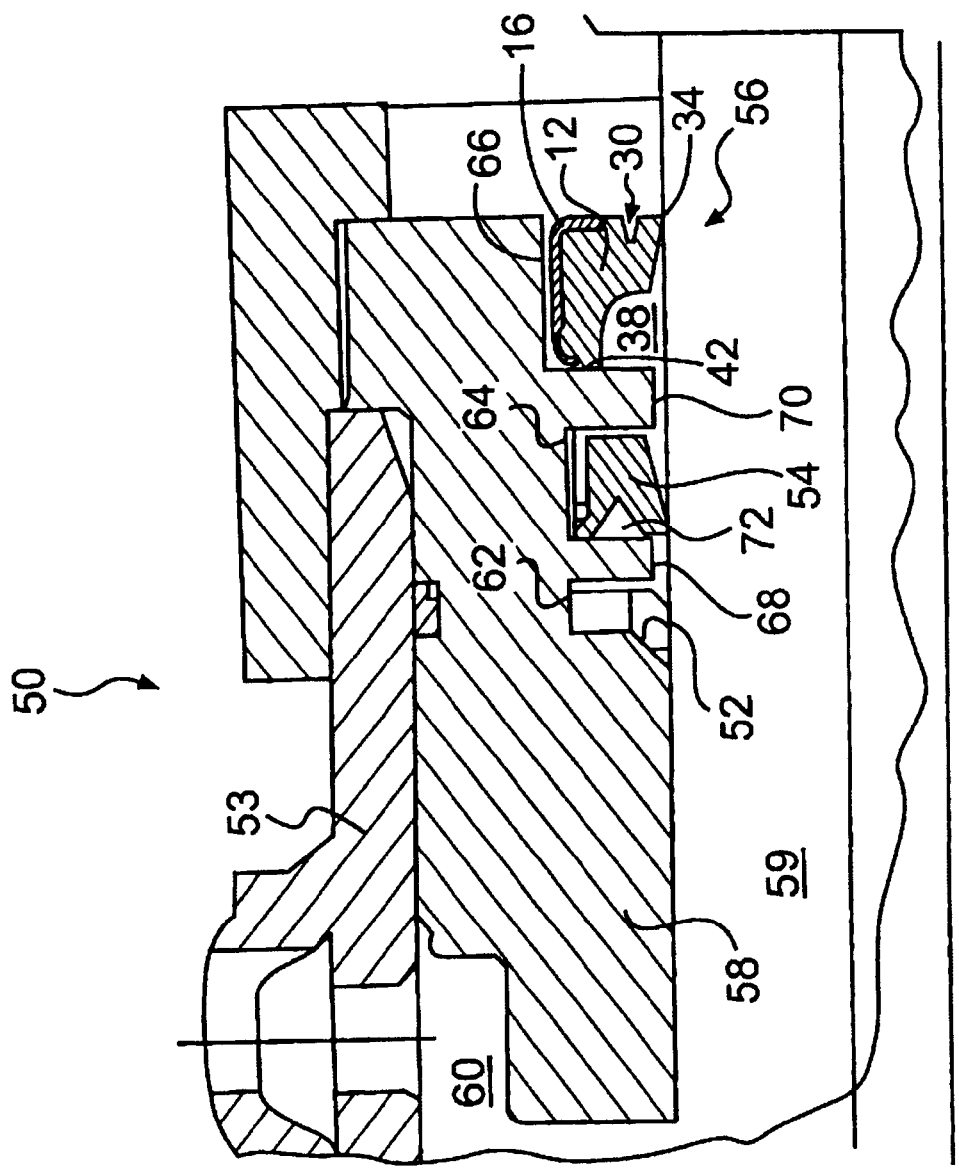
FIG. 3 is a cross-sectional view of a portion of a hydraulic component in accordance with an exemplary embodiment of the present invention.

As shown in FIG. 3, wiper seal 10 may be incorporated as part of a sealing assembly 56 for a hydraulic component 50. Hydraulic component 50 includes a housing 53 that defines at least one fluid chamber 60. A cylinder head 58 having three annular grooves 62, 64, and 66 caps one end of housing 53. A rod 59 is slidably received in an opening of cylinder head 58.

Sealing assembly 56 includes a buffer seal 52, a U-cup seal 54, and wiper seal 10. Buffer seal 52 is placed in first annular groove 62. U-cup seal 54 is placed in second annular groove 64. Wiper seal 10 is placed in third annular groove 66.

Each of the buffer seal 52, U-cup seal 54, and wiper seal 10 engage a portion of the surface of rod 59 to form three separate seals. As illustrated, buffer seal 52 is positioned closest to fluid chamber 60. Wiper seal 10 is the outermost seal. U-cup seal 54 is disposed between buffer seal 52 and wiper seal 10. A first gap 68 separates buffer seal 52 from U-cup seal 54 and a second gap 70 separates U-cup seal 54 from wiper seal 10.

One function of buffer seal 52, as the seal closest to fluid chamber 60, is to create a high-pressure seal to prevent the escape of fluid from fluid chamber 60. It is expected, however, that some fluid may leak through buffer seal 54 along the surface of rod 59. This fluid will collect in first gap 68.

U-cup seal 54 provides a second barrier to prevent fluid from leaking out of housing 58. Any fluid that leaks through buffer seal 52 and collects in first gap 68 is scraped from the surface of rod 59 by the lip of the U-cup seal 54. This fluid collects in a recess 72 in U-cup seal 54. When the pressure of the fluid in fluid chamber 60 decreases to a relatively low level, the pressure of the fluid in recess 72 and first gap 68 acts on buffer seal 52 to move the lip of buffer seal 52 out of engagement with the surface of rod 59. The disengagement of buffer seal 52 from the surface of rod 59 allows the trapped fluid to return to fluid chamber 60.

One function of wiper seal 10, as the outermost seal, is to prevent dirt and debris from contaminating fluid of hydraulic component 50. Wiper seal 10 is typically forcibly fit into third annular groove 66. Outer surface 25 of support member first leg 18 engages a surface of third annular groove 66 to ensure that wiper seal 10 remains in place within third annular groove 66. Second radial face 42, which, as described previously, extends past second end 24 of support member first leg 18 also engages a surface of third annular groove 66. The engagement of second radial face 42 with the surface of third annular groove 66 creates a seal that prevents fluid from escaping housing 53 between wiper seal 10 and cylinder head 58.

When wiper seal 10 is in place in cylinder head 58, rod 59 may be inserted through opening 14 in wiper seal 10. Opening 14 is configured to have a close tolerance with the surface of rod 59 so that lip 34 forms a compression-type seal with the surface of rod 59. In other words, the insertion of rod 59 into opening 14 compresses body portion 12. In response, the elastomeric properties of body portion 12 cause lip 34 to exert a force on the surface of rod 59, thereby creating a seal.

First cutout 30 provides an area into which body portion 12 may flex when rod 59 is inserted through opening 14. This flexing action of body portion 12 reduces the amount of compression in body portion 12 and, thus, reduces the amount of force exerted on the surface of rod 59 by lip 34, without significantly reducing the contact area of lip 34 on the surface of rod 59. In this manner, the wiper seal of the present invention creates an effective seal with the surface of the rod without unduly wearing the surface of the rod when the rod slides within housing 53.

In addition, the flexing action of body portion 12 may result in lip 34 exerting an evenly-distributed force along the surface of rod 59. Thus, when the rod 59 is extended, any fluid left on the surface of rod 59 may have a uniform thickness around the surface of the shaft. The uniform distribution of fluid may reduce the likelihood of an operator perceiving a leak in the sealing assembly.

Industrial Applicability

As will be apparent from the foregoing disclosure, the present invention provides a wiper seal for a hydraulic component that will result in reduced wear on the surface of the rod. The wiper seal includes a first cutout area on the outer radial face of the seal. This cutout area allows the body portion of the seal to flex when engaged with the surface of the rod, thereby reducing the force exerted on the surface of the rod.

The present invention may be incorporated into the sealing assembly of any hydraulic component. Thus, the wiper seal of the present invention has wide applications in a variety of machines that include hydraulic actuators and/or hydraulic cylinders. The present invention provides advantages in that it reduces the wear on the rod and thereby reduces the amount of required maintenance on the hydraulic component.

It will be apparent to those skilled in the art that various modifications and variations can be made in the disclosed seal without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A wiper seal, comprising:
    a support member including a first leg having an inner surface, a first end, and a second end and extending substantially parallel to a reference axis and a second leg having an outer surface extending substantially perpendicular to the reference axis from the first end of the first leg; and
    a body portion defining an opening therethrough and including:
        an outer peripheral surface configured to receive the inner surface of the first leg of the support member;
        a first radial face extending substantially coplanar to the outer surface of the second leg and including a first cutout;
        an inner surface disposed at an angle relative to the reference axis and extending to a lip adjacent the first radial face; and
        a second radial face extending generally perpendicular to the reference axis from the second end of the first leg of the support member and including a second cutout;
        wherein the second end of the first leg of the support member is curved and extends into a notch defined by the outer peripheral surface of the body portion.

2. The wiper seal of claim 1, wherein the first cutout is a channel having a curved inner surface.

3. The wiper seal of claim 1, wherein the first cutout is substantially centered in the first radial face between the lip and the second leg of the support member.

4. The wiper seal of claim 1, wherein the body portion is formed of an elastomeric material and the support member is formed of a metallic material.

5. The wiper seal of claim 1, wherein the second cutout has a curved surface connecting the second radial face with the inner surface of the body portion.

6. A hydraulic component, comprising:
    a housing defining at least one chamber configured to hold a pressurized fluid, the housing having a head defining an opening;
    a rod having a surface and disposed for sliding movement in the opening of the housing; and
    a wiper seal disposed in the housing and including:
        a support member including a first leg having an inner surface, a first end, and a second end and extending substantially parallel to a reference axis and a second leg having an outer surface extending substantially perpendicular to the reference axis from the first end of the first leg; and
        a body portion defining an opening configured to receive the rod and including:
            an outer peripheral surface configured to receive the inner surface of the first leg of the support member;

a first radial face extending substantially coplanar to the outer surface of the second leg and including a first cutout;

an inner surface disposed at an angle relative to the reference axis and extending to a lip adjacent the first radial face, the lip configured to engage the surface of the rod; and a second radial face extending generally perpendicular to the reference axis from the second end of the first leg of the support member and including a second cutout;

wherein the second end of the first leg of the support member is curved and extends into a notch defined by the outer peripheral surface of the body portion.

7. The hydraulic component of claim 6, further including a second seal and a third seal, each of the second and third seals configured to engage the surface of the rod between the at least one chamber and the wiper seal.

8. The hydraulic component of claim 7, wherein the second seal is a buffer seal and the third seal is a U-cup seal.

9. The hydraulic component of claim 7, wherein the housing includes a first annular groove configured to receive said second seal, a second annular groove configured to receive said third seal, and a third annular groove configured to receive the wiper seal.

10. The hydraulic component of claim 6, wherein the first cutout is a channel having a curved inner surface.

11. The hydraulic component of claim 6, wherein the first cutout is substantially centered in the first radial face between the lip and the second leg of the support member.

12. The hydraulic component of claim 6, wherein the body portion is formed of an elastomeric material and the support member is formed of a metallic material.

13. The hydraulic component of claim 6, wherein the second cutout has a curved surface connecting the second radial face with the inner surface of the body portion.

* * * * *